R. V. MORSE.
BOMB DROPPING SYSTEM.
APPLICATION FILED JAN. 4, 1918.
1,374,314.
Patented Apr. 12, 1921.
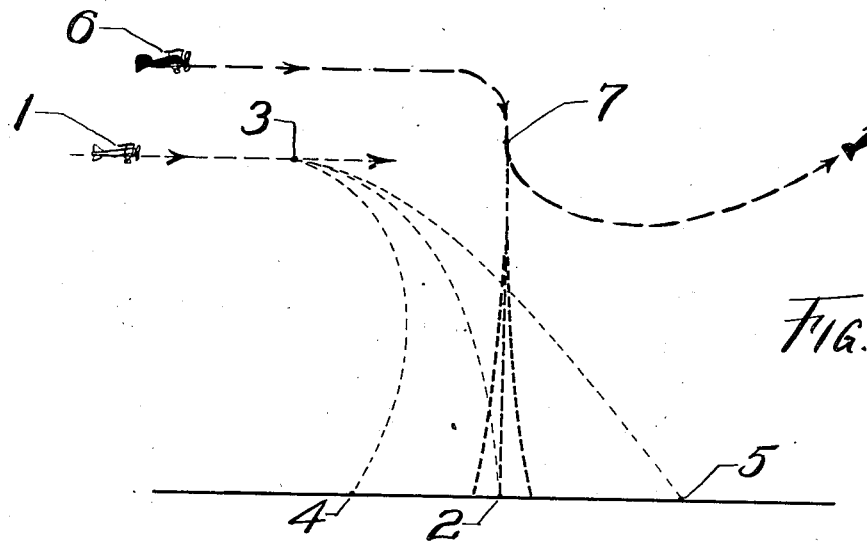
Fig. 1.
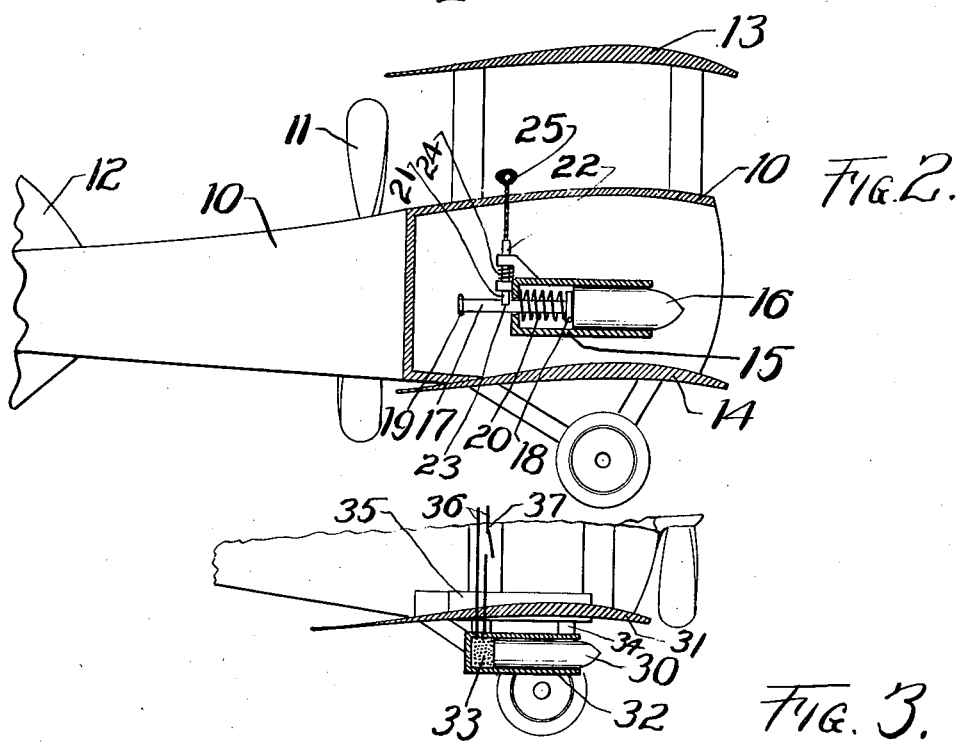
Fig. 2.
Fig. 3.
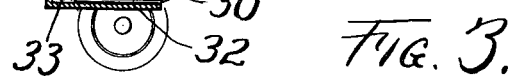
Robert V. Morse
INVENTOR

UNITED STATES PATENT OFFICE.

ROBERT V. MORSE, OF ITHACA, NEW YORK.

BOMB-DROPPING SYSTEM.

1,374,314.    Specification of Letters Patent.    Patented Apr. 12, 1921.

Application filed January 4, 1918. Serial No. 210,386.

*To all whom it may concern:*

Be it known that I, ROBERT V. MORSE, a citizen of the United States, residing at Ithaca, in the county of Tompkins and State of New York, have invented a new and useful Bomb-Dropping System, of which the following, taken with the accompanying drawings, is a specification.

This invention relates to the military arts, and in particular to the dropping or discharging of bombs from aircraft to targets located below.

In bombing operations as at present conducted the bombs are dropped while the aircraft is flying rapidly in a direction substantially at right angles to the direction of the target. The trajectory of a bomb dropped under these conditions has a large component in a horizontal direction, which gives the trajectory a pronounced curvature,—making it difficult to secure accurate results. The bombing airplane has generally a horizontal velocity of 100 or 150 feet per second, and even when the curvature of the trajectory has been accurately computed the instant of discharge of the bomb must be gaged with the utmost nicety if the target is to be hit. In addition to this difficulty, the curvature of the trajectory is very difficult to determine with any great degree of accuracy, as the altitude can only be estimated from barometric readings, in which an error of several hundred feet is common; and these barometric determinations enter into the necessary computations of height and horizontal velocity of the aircraft. These factors which at present render the aiming of bombs from aircraft uncertain and erratic would be largely obviated if the trajectory were substantially straight instead of curved as at present. It is the first part of the trajectory, with its pronounced curvature, which causes the error, and if this portion be eliminated so as leave a fairly straight trajectory, the problem is greatly simplified.

The objects of the present invention are to improve the accuracy of bombing operations by increasing the straightness of the trajectory, by diminishing the time of flight of the bomb, by diminishing the horizontal velocity of the aircraft during the time when the bomb is discharged, and also to drop the bombs in such a manner as to minimize the effect of errors in barometric determinations of altitude, errors in the determination of the velocity of the aircraft relative to the ground, and errors in timing, which have heretofore so largely influenced the accuracy of bomb dropping. Another object is to arrange the bomb dropping apparatus in such a manner that the bomb may be released in the direction of motion of the aircraft when the aicraft is diving.

In the drawings, Figure 1 is a diagram illustrating the method of bomb dropping, and the type of trajectories obtained from bombs dropped from aircraft under the old and the new method; Fig. 2 illustrates one means for discharging bombs in a forward direction, that is, along the line of motion of the aircraft; Fig. 3 illustrates another means for discharging bombs in the direction of motion of an aircraft.

Referring to Fig. 1, the airplane 1, diagrammatically represented, is shown as flying in a generally horizontal direction as is customary for bomb dropping machines. The target is located on the ground at the point 2. Assuming the case where the airplane is flying in still air, so that its flying velocity relative to the air is the same as its velocity relative to the ground, a bomb would be dropped at the point 3 and follow the trajectory 3—2 to the target. In the case where the airplane 1 is flying against a strong head wind, so as to greatly reduce the velocity of the airplane relative to the ground, the bomb trajectory would be more in the nature of the curve 3—4 and the bomb must be dropped much later than in the first case if the target is to be hit. On the other hand, if the airplane is flying with the wind so as to have a much higher velocity relative to the ground than relative to the air, the trajectory 3—5 would carry the bomb over the target, so that in such a case the bomb must be dropped much earlier than in the first case, if the target is to be hit. The velocity of the airplane relative to the ground and also its altitude are both difficult to ascertain with any high degree of accuracy; and this, taken with the wide variation in the possible trajectories, make the problem one of great difficulty. The serious influence of the initial horizontal velocity of 100 feet per second or more will be understood from the fact that the bomb falls only about 16 feet in the first second, 64 feet by the next second, and has only dropped about 144 feet by the third second; thus during the first part of the trajectory the bomb travels across the target more than down toward the ground,—and it is consequently this first part of the trajectory which causes the greatest errors.

The purpose of the following system of bomb dropping is to overcome the difficulties described, by eliminating in effect the first highly curved portion of the trajectory, so that the bomb may fall directly toward the target. Referring again to Fig. 1, the airplane 6, shown as flying at a somewhat higher altitude than the airplane 1, is arranged so that it may drop bombs in a forward direction,—that is, in the direction of its motion when diving. As it comes to a point nearly over the target 2, it is operated so as to dive directly toward the target 2. Its velocity almost instantly increases to say 200 miles per hour, (294 feet per second), and the bomb is dropped or discharged during this period when the airplane is substantially vertical,—as at the point 7. The bomb is aimed by aiming the airplane, somewhat as the machine gun in a one-man fighting airplane is aimed. A slight allowance is made for windage and for the residual horizontal velocity of the airplane. The downward dive is commenced when a substantially vertical sight shows the aircraft to be nearly over the target.

The bomb drops faster than the airplane, owing to the greater air resistance of the latter; and the bomb may also be given a moderate initial velocity relative to the airplane if desired, by the use of any suitable bomb discharging apparatus. The word "dropped" as used herein in reference to bomb dropping should be understood as including not only the case where the bomb's initial velocity is merely that of the airplane, but also the cases where the releasing mechanism gives the bomb a greater initial velocity than the airplane. The term "dropping" merely implies that gravity is the most important impelling force,— the ultimate velocity being greater than the initial velocity given by the discharging device.

As soon as the bomb leaves the airplane, the latter resumes its normal flight, either in the manner indicated in Fig. 1, or by looping-the-loop, making a semi-loop and side turn, or in any other manner in the discretion of the aviator. The apparently erratic flight of the aircraft under this system of bomb dropping is advantageous in avoiding the fire of anti-aircraft artillery.

Returning to the consideration of the bomb which has been dropped from the diving airplane 6, it will be noted that the bomb started with a large vertical velocity and a comparatively small horizontal velocity. The trajectory under these conditions is a comparatively straight vertical line, 7—2, slightly influenced in one direction or the other by the prevailing winds. In the first second the bomb drops a distance which under ordinary conditions of free fall would take about four seconds; its total time of fall is generally reduced to but a fraction of the time required under the old conditions, and the effect of horizontal travel and windage is accordingly reduced. The aiming, though done by merely pointing the airplane, is thus more accurate than under the prior conditions of bomb dropping where elaborate apparatus was employed,—due particularly to the small horizontal component in the initial velocity.

In order that the bomb may be given its initial velocity in the direction of the target while the airplane is diving, the bomb must be arranged so that it can be released in a forward direction, that is, in the direction of motion of the airplane,—as distinguished from the old practice under which the initial movement of the bomb relative to the aircraft was at right angles to the direction of motion of the aircraft. Any bomb releasing or bomb projecting device may be employed, so long as it is arranged to permit the bomb to be dropped during the period when the aircraft is diving toward the earth. In Fig. 2 and Fig. 3 there are shown illustrative types of apparatus arranged to permit the bomb to leave the aircraft in the direction of motion of the latter, so that the bomb can be discharged toward the earth when the aircraft is diving toward the earth. Any other type of apparatus arranged to project the bomb in the same direction may be employed.

Referring to Fig. 2, which shows, partly in section, a biplane aircraft of the double propeller type,—the reference numeral 10 indicates the body of the airplane, 11 one of the propellers, and 12 the tail, shown partly broken away. Between the upper wing 13 and the lower wing 14 is shown located the bomb dropping apparatus 15, which may be placed near the center of support so as not to interfere with the handling of the aircraft. This bomb dropping apparatus 15 consists of a cylindrical barrel in which rests the bomb 16, pointing forward in relation to the aircraft. Behind the bomb 16 is arranged a pusher rod 17, having a head 18 and an exterior head 19, by which the rod 17 can be pulled out, compressing the ejecting spring 20, as shown. The rod 17 with the spring 20 compressed is held in that position by the detent 21 on the plunger 22, which is held in the notch 23 of the rod 17 by the action of the detent spring 24. A handle 25 is attached to the plunger 22.

The operation is as follows: When the aircraft is diving downward toward the target the handle 25 is pulled, withdrawing the detent 21 from the rod 17, whereupon the action of the ejecting spring 20 forces the bomb 16 from the barrel 15. The forward part of the airplane body is open so that the bomb may drop toward the target without striking the airplane. If the spring 20 is only of sufficient strength to merely push the bomb 16 clear of the barrel, the bomb leaves with an initial velocity approximately equal to the diving velocity of the aircraft; if a stronger spring is used, as is advantageous, the initial dropping velocity of the bomb is even greater than the velocity of the diving airplane.

The bomb dropping apparatus, instead of being located between the wings, may be located above or below the wings, or in front of them if desired,—according to the type of aircraft employed. In Fig. 3, which is a fragmentary view of the body and lower wing of an airplane, the bomb 30 is carried below the lower wing 31. The bomb dropping mechanism consists of the barrel 32, carrying the bomb 30, behind which is placed a small charge of black powder 33. The barrel 32 is carried by means of the brackets 34 on the recoil cylinder 35, which eases the shock of discharge. Connected to any suitable detonator in the powder charge 33 are the wires 36, having the switch 37. The wires 36 may be connected to the ignition system of the airplane or any other suitable source of electricity.

The operation is as follows: When the airplane is diving downward toward the target the switch 37 is closed, and the resulting explosion of the powder charge 33 propels the bomb 30 forward in the direction of motion of the airplane, that is to say, downward,—with a dropping velocity somewhat greater than the airplane. The resulting high velocity of the bomb insures an almost straight trajectory, and shortens the time of flight of the bomb, besides insuring that it will almost instantly clear the airplane. Where the initial velocity of the bomb is not much greater than that of the airplane, the bomb will still fall away from the airplane, owing to the greater air resistance of the latter, under ordinary conditions; but a considerable initial velocity of the bomb relative to the airplane is nevertheless highly desirable for reasons which have been stated above. It will be noted that in Fig. 3 as well as in Fig. 2, the bomb is arranged so that it may drop forward in the direction of motion of the diving airplane, without striking any portion of the airplane.

It should be understood that the foregoing types of bomb dropping apparatus are illustrative only, and that any other type of bomb dropping apparatus may be used, provided that it is arranged in such a position on the airplane that the bomb may be released while the airplane is diving downward. Many other variations and modifications will be evident to those skilled in the art, without departing from the scope of the invention as outlined in the following claims.

I claim as my invention:

1. The method of dropping bombs from aircraft, which consists in pointing the aircraft downward when substantially over the target and in dropping a bomb while the aircraft is diving rapidly downward, whereby the bomb is dropped with a high initial velocity downward and a comparatively small velocity component in a horizontal direction.

2. The improvement in the art of dropping bombs from aircraft which consists in carrying a bomb attached to an aircraft until it is substantially over a target, then causing the aircraft to dive substantially vertically toward the target, and then detaching the bomb while the aircraft is pointed at the target, whereby the horizontal component of the bomb trajectory is substantially eliminated and the bomb is hurled with a high initial vertical velocity toward the target.

In witness whereof I have hereunto set my hand this 31st day of December, 1917.

ROBERT V. MORSE.